United States Patent [19]
Renk et al.

[11] Patent Number: 5,255,815
[45] Date of Patent: Oct. 26, 1993

[54] FILLER CAP

[75] Inventors: Richard J. Renk; Richard M. Ebert, both of Winona, Minn.

[73] Assignees: Carol Ann Mackay; Helen Lou Kurtz, both of Winona, Minn.

[21] Appl. No.: 630,162

[22] Filed: Dec. 19, 1990

[51] Int. Cl.⁵ ............................................. B65D 45/28
[52] U.S. Cl. .................................. 220/323; 220/314; 220/305; 220/86.1
[58] Field of Search ............... 220/315, 314, 305, 323, 220/DIG. 19, DIG. 33, 86.1, DIG. 24, 326

[56] References Cited

U.S. PATENT DOCUMENTS

| | | | |
|---|---|---|---|
| 609,569 | 8/1898 | Berchtold | 220/323 |
| 1,178,969 | 4/1916 | Thaler | 220/314 X |
| 2,097,173 | 10/1937 | Bazeley | 220/305 |
| 2,629,514 | 2/1953 | Savolainen | 220/314 |
| 3,690,504 | 9/1972 | Ragettli | 220/305 |
| 4,622,902 | 11/1986 | Miller | 220/324 X |

FOREIGN PATENT DOCUMENTS

| | | | |
|---|---|---|---|
| 543912 | 4/1928 | Fed. Rep. of Germany | 220/314 |
| 392074 | 5/1933 | United Kingdom | 220/314 |

Primary Examiner—Allan N. Shoap
Assistant Examiner—Paul A. Schwarz
Attorney, Agent, or Firm—Richard J. Renk

[57] ABSTRACT

The cap is for use in closing the end of an opening as may be provided in a container. The cap has an elastomeric top which is deflectable by a presser plate urged toward the top and opening by a biasing spring. Deflection of the elastomeric top enables the cap to seat and adjust around the opening and accommodate variances therein.

9 Claims, 2 Drawing Sheets

FILLER CAP

BACKGROUND OF INVENTION

The present invention relates generally to the retaining of materials in cases and more particularly to the retaining of lubricants in traction motor gear cases such as found in diesel and electric locomotives and generally shown in U.S. Pat. No. 4,470,324.

Because of the critical nature of the gear case, it is important to retain the lubricant in the case and keep dirt, brake shoe dust, water and other contaminants out. However, up to this time, it has been difficult to retain lubricants because of the many variables involved such as the extreme vibration transmitted to the gear case through the unsprung wheels and axles, because of the characteristics of the lubricants necessary for proper lubrication of the gears (which often times include chunks of polyethylene bag materials and the like), and because of distortion and bending of the gear case due to being hit by debris along the track roadbed such as rocks, ice, snow and metal objects.

SUMMARY OF INVENTION

The present invention overcomes the problems of prior filler caps by providing one which can accommodate variations in the gear case filler opening due to bending and abuse in locomotive service and at the same time survive the extreme weather and vibration conditions in such service. This is accomplished by providing a cap having a top which is deformable and can adjust to a variation in height as well as the size of the opening in which it fits.

PREFERRED EMBODIMENTS

Figure 1:
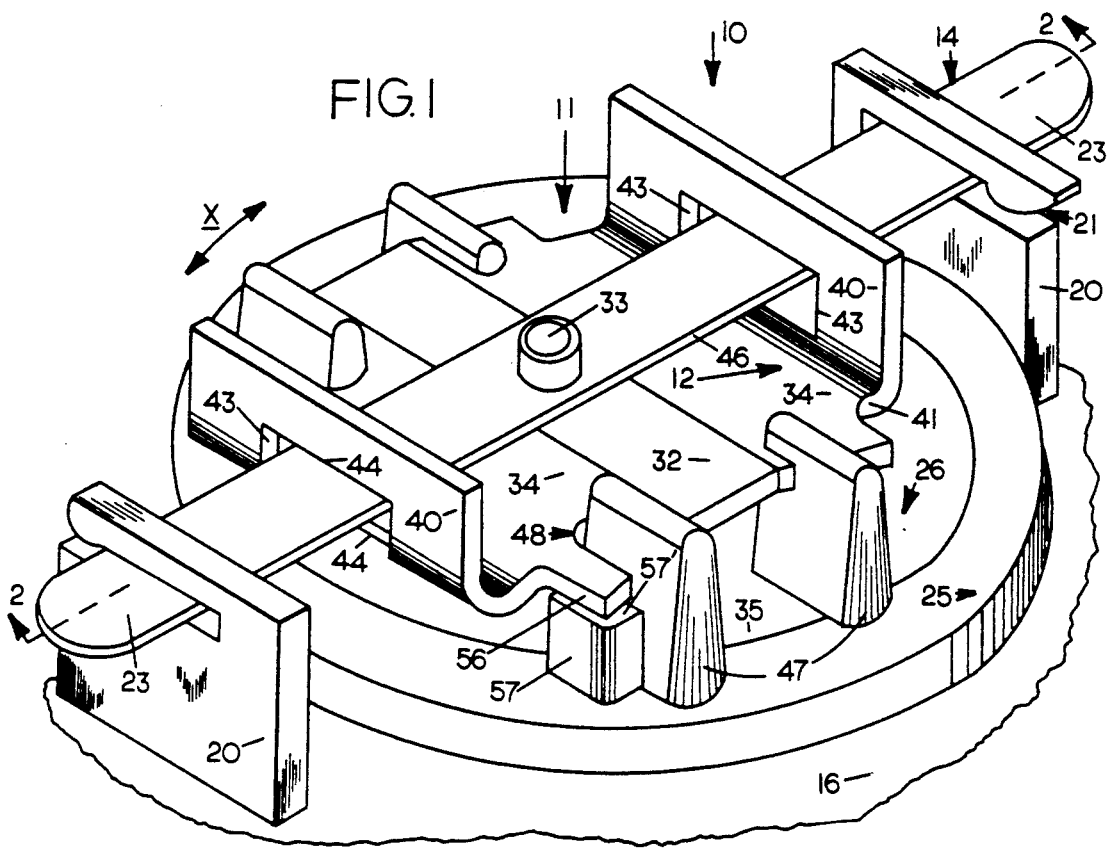
FIG. 1 is a perspective view of one form of the cap.

In the drawings, the cap of the invention is indicated generally by the numeral 10. As may be best seen in FIGS. 2 and 3, the cap may include an elastomeric top 11, a presser means 12 which may be in the form of a more rigid member than the top such as a metal or plastic plate and biasing means 14 which may be in the form of a longitudinally extending leaf spring.

The cap is adapted to close a lubricant fill opening 15 in the side 16 of a traction motor gear case or other retaining container. The opening 15 may be circular and formed in a tubular pipe or conduit 17 having an inner surface or wall 18 and an end wall or rim area 19 adjacent the opening. The rim thus provides a support surface and defines a mounting plane.

Retention of the cap 10 in the opening is accomplished by upstanding latching hooks or tabs 20 welded to the gear case side 16. The hooks 20 are somewhat "C" shaped with slits 21 in opposed hooks facing in opposite directions to allow the spring ends 23 to enter when the cap is rotated or twisted during installation.

Figure 2:
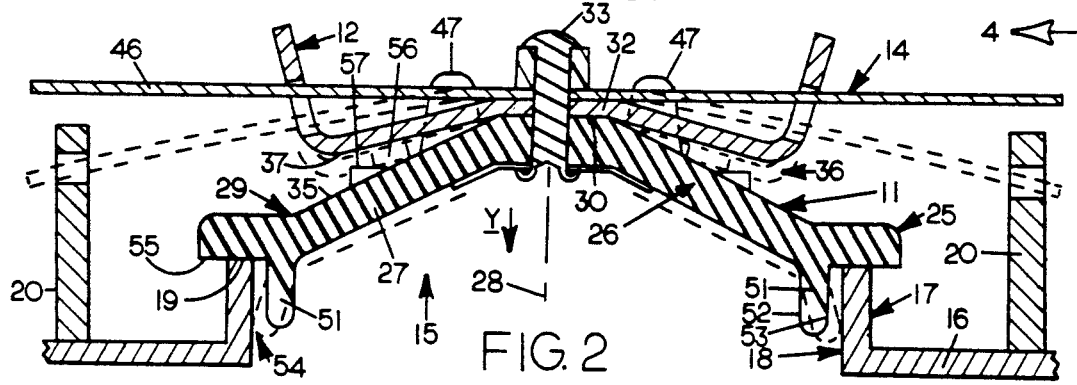
FIG. 2 is a schematic sectional view taken generally along lines 2—2 of FIG. 1.

As may be seen in FIGS. 1 and 2, the cap top may be circular and include an annular flange or contact means 25 which is adapted to engage the conduit rim 19. (In some cases the flange may extend radially beyond the rim to provide additional shielding as in FIG. 3). The top has a deflectable means which may be in the form of a bulged area such as a dome or frustro-conical section 26. The dome has a wall section 27 extending from the flange 25, (beginning at a point 29 generally to the inside of the conduit's inner wall 18), and tapering radially inwardly and upwardly toward the center cap axis 28. This positions the dome upwardly away from the opening 15 and above the plane defined by the rim 19. At its upper end or apex, the dome has a flat wall 30 against which the presser plate 12 bears.

The presser plate 12 may have a center flat band 32 across its width which engages the dome flat 30 and is secured thereto together with spring 14 above it by a rivet 33. Legs 34 extend downwardly away from the plane of the band 32 and on each side thereof to follow the general incline of the dome top surface 35 but are generally spaced therefrom as 36 in the free or unmounted position (solid lines FIG. 2). In other words, the underside 37 of the presser plate is somewhat concave downwardly toward the opening 15. In a typical application the leg 34 might be at an approximate 15 degree angle from the plane of band 32 while the tapered top wall 35 would be approximately 27 degrees.

To aid in protecting the leaf spring 14 and aid in imparting rotation to the cap, the presser 12 has ears 40 projecting upwardly from the lowermost extension 41 of the legs 34 so as to extend and above the plane of the leaf spring 14. Apertures or openings having side walls 43 and top and bottom walls 44 are provided in the ears to allow the leaf spring to extend therethrough. As may be seen in FIGS. 1 and 2, leaf spring 14 projects beyond the cap and may deflect in cantilever fashion about the center rivet 33. During installation, when rotating or twisting the cap 10 in the direction "X" (FIG. 1), the leaf springs side edges 46 may engage the side walls 43 of the presser plate openings.

Figure 5:
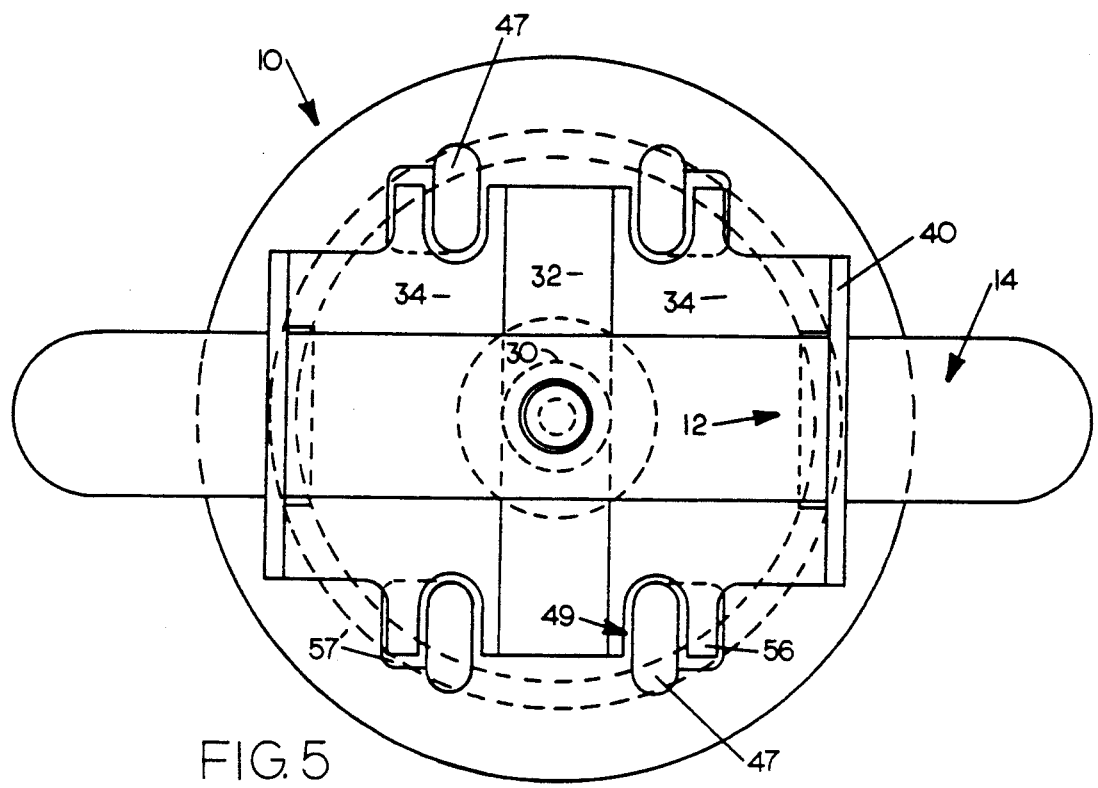
FIG. 5 is a top view of the cap.
Figure 6:
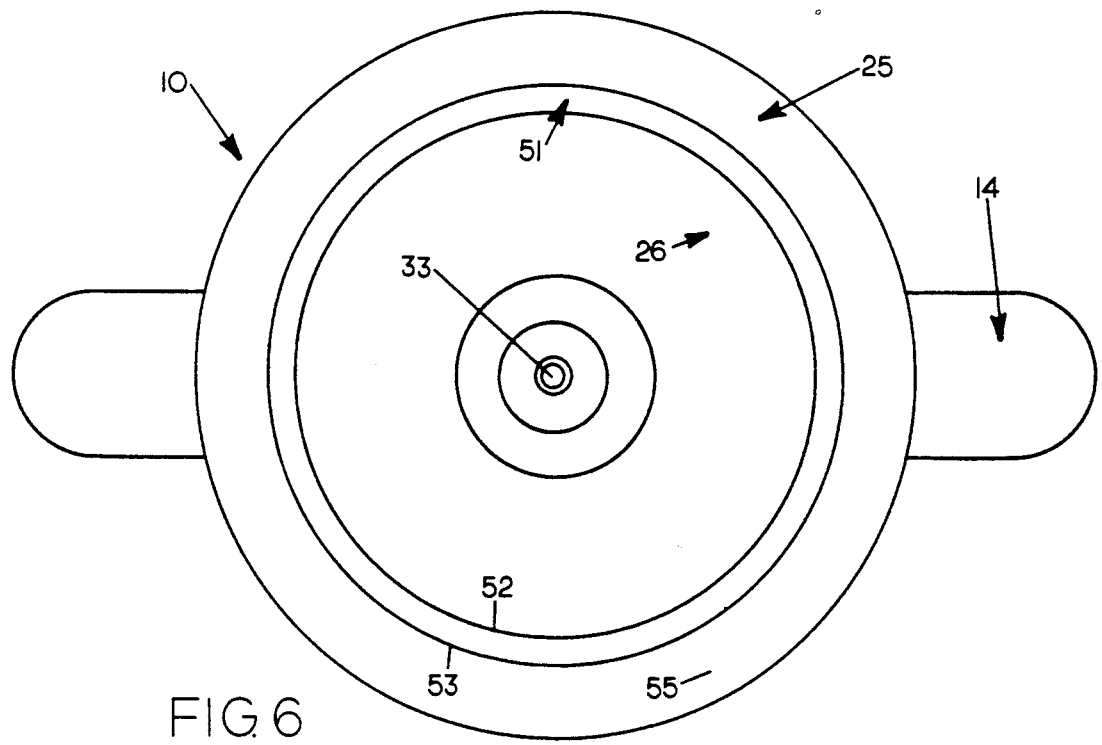
FIG. 6 is a bottom view of the cap.

Rotation of the presser plate 12 is transmitted to the cap top 11 through lugs or stop means 47 which project upwardly from the top 12 sc) as to extend through complementary notches or slots 48 in the presser plate. The lugs 47 are positioned to extend above a portion of the flange 25 and upwardly a short distance along the top surface or side 35 (FIG.1) of dome. The lugs 47 are thus generally above and bridge over an area adjacent the inside wall 18 of the conduit 17. Clearance 49 is provided between the lugs 47 and the slot 48 as shown in FIG. 5 to allow the presser means 12 to move downwardly toward the top 11 and toward the filler (opening 15 and the plane defined by the rim 19) so as to provide seating of the cap. At the same time, the clearance 49 permits limited rotational movement and tilting of the presser plate 12 relative to the top 11 for the purpose of accommodating variations in the location of opening 15 and variations in the latch hooks 20.

To provide additional restriction to lubricant loss, the top 11 may be provided on its underside with a pilot 51 or depending means such as a lip to enter the filler opening 15. As shown in FIG. 2 the pilot 51 may take the form of a radially expandable cylindrical lip having an inner unsupported wall 52 and an outer wall 53. The pilot projects downwardly from the underside 55 of flange 25 from a point somewhat in alignment with the juncture 29 of the flange 25 with the tapered or inclined dome wall 27.

Downward deflection of the dome wall 27 toward the dotted line position FIG. 2. (in the direction "Y") under pressure from the biasing leaf spring 14 and presser plate 12 will cause the pilot end 54 to move or swing toward the conduit inner wall 18. The inclined or tapered wall 27 thus acts in the nature of a beam to transfer its movement to the pilot 51 which swings about a fulcrum generated by the thicker flange 25.

As the presser plate 12 moves downwardly to the closed position (dotted line FIG. 2), spaced engagement means in the form of fingers 56 (forming one side of the slot 48 toward the lower part of presser plate legs 34) engage upwardly projecting pressure transfer means in the form of pads 57 adjacent the lugs 47 to force the flange underside 55 tightly against the rim 19. Fingers 56 are located radially outwardly toward the flange 25 from the presser plate's flat 32 and the dome flat 30. In the closed position of the cap (dotted line position FIG. 2), the fingers 56 contact the pads 57 but some gap 36 between the pressure plate underside 37 and the dome top surface 35 still exists so as not to detract from the pressure of the fingers. In other words, the presser 12 applies pressure at spaced apart points such as at flat 30 and at pads 57.

Figures 3, 4:
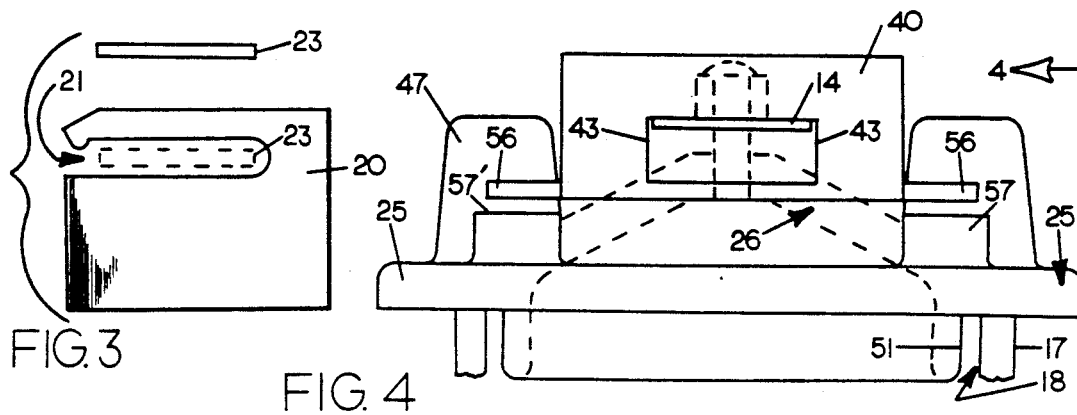
FIG. 3 is a view looking generally along lines 4—4 of FIG. 2 but limited to the cap latching arrangement.
FIG. 4 is an end view of the cap as viewed along lines 4—4 of FIG. 2.

As shown in FIGS. 4 and 5, the pads 57, preferably, are close to or bridge above a projection of the conduit rim 19 (FIG. 4); pressure applied to the pad's top surface 57' is thus transmitted to the flange 25 to aid in seating it against the rim. Such pressure on the flange is in addition to the pressure on the flange exerted by the deflection of the dome 26. As shown in FIGS. 1 and 2, pads 57 are spaced apart from one another and from the top's apex flat 30 and may be in the form of axially extending columns. The columns are generally parallel to center axis 28 and are attached or formed as a lateral extension on the side of lugs 47 (but generally of lower axial height). Being attached to the lugs 47, pressure applied to the pads 57 is transferred through the lugs to the flange.

In use, to install the cap the spring ends 23 may be deflected downwardly to align with the latch hook slots 21. Once aligned, the cap is rotated to cause the spring ends to enter the slits. As a further aid to insertion, the cap dome wall 27 may be urged toward the dotted line position (FIG. 2) by pressure on top of the rivet 23 using a tool or hands. When the spring ends 23 are rotated into the slits 21, the spring 14 will exert a downward sealing pressure in direction "Y" against the dome 26 to seat the cap and flange 25 against the conduit rim 19. At the same time, downward movement of the dome 19 may cause the pilot 51 to swing toward the conduit inner wall 18 to provide additional restriction. Thus, by virtue of the pliancy of the top 11 and the ability of biasing leaf 14 to adjust to the different deflection positions of the dome, and the ability of the presser 12 to tilt at the pad 30 and rivet area because of the space 36 and the pliancy of the dome 26, the cap may accommodate variations in the surface of the rim, heights of the rim, bent hooks, etc. as is often en-countered in locomotive service.

While the invention has been illustrated and described by the reference to preferred embodiments and with specific reference to a twist cap concept, it is not limited thereto and may be applied to concepts where the spring may be latched without the twisting action. Also, while the cap has been shown to seat against the rim of a conduit or tulle, it can also seat against the rim of an opening or hole as might be made directly into the side 16 of a gear case or the like without using a conduit extension.

What we claim is:

1. A traction motor gear case lubricant filler cap for use with a gear case provided with an opening having an inner wall and a rim area adjacent said opening comprising, a top, said top having a continuous deflectable portion moveable toward and away said opening, said top having an integral depending lip projecting downwardly from said deflectable portion, said lip being a radially expandable and contractible continuous member adapted to extend into said opening, a presser means approximately following the contour of said top carrier by said cap for engaging said top, and resilient biasing means operably connected to and moveable toward said top for urging said presser means toward said top to cause said deflectable portion to move toward said opening and move said top toward said rim area.

2. A cap as claimed in claim 1 wherein said top has an upper and a lower side and pressure transfer means are provided for engagement with said pressure means, said pressure transfer means being located on said top's upper side.

3. A cap as claimed in claim 1 wherein stop means are provided to cooperate with said top and said presser means to limit rotational movement of said presser means relative to said top while allowing tilting movement of said presser means relative to said top and said biasing means.

4. A cap as claimed in claim 1 wherein said presser means includes a member shaped approximately to conform to said deflectable means of said top to enable said presser means to contact said top at spaced points and along a central area thereof, and wherein said presser means further includes means for restraining movement of said biasing means.

5. A traction motor gear case lubricant filler cap for use with a gear case provided with an opening having an inner wall and a rim area adjacent said opening comprising, a top, said top having a continuous deflectable portion moveable toward and away said opening, said deflection portion being somewhat dome shaped and having a center axis and wherein a continuous depending lip extends downwardly opposite said dome and moveable radially outwardly away from said center axis toward said inner wall of said opening as said dome is moved toward said opening and returning radially inwardly toward said center axis as said dome is moved away from said opening, a presser means approximately following the contour of said top carried by said cap for engaging said top, and resilient biasing means operably connected to and moveable toward said top for urging said presser means toward said top to cause said deflectable means to move toward said opening and move said top toward said rim area.

6. A traction motor gear case lubricant filler cap for use with a gear case provided with an opening having an inner wall and a rim area adjacent said opening comprising, a top, said top having a deflectable portion moveable toward said opening, a presser means carried by said cap for engaging said top, biasing means for urging said presser means toward said top to cause said deflectable portion to move toward said opening and move said top toward said rim area, said presser means including a plate member with an upturned end provided with an opening having a wall, and wherein said biasing means extends into said opening and is adapted to engage said wall to turn said cap.

7. A cap for use with a retaining container device having a generally circular opening therein generated about a center axis, said opening having an inner wall and a rim area generally around said opening defining a mounting plane, said cap comprising, a top having contact means adapted to engage said rim area, said top also having a generally elastomeric deflectable section extending radially inwardly and upwardly from said contact means toward said center axis and away from said mounting plane of said rim area and terminating in an apex area, a presser member secured to said top adjacent said apex area, said presser member being formed to extend downwardly and radially outwardly toward said contact means of said top but being generally spaced from said top in its free position, biasing means supported by said top for urging said presser member and said top toward said opening in an installed position of said cap, said presser member further having engagement means spaced radially outwardly and downwardly from said apex for interacting with and applying pressure to said contact means to urge said contact means toward said rim area under urging by said biasing means, and stop means to limit rotational movement of said presser member relative to said top while allowing movement of said presser member toward said top in a direction approximately parallel to said center axis, said stop means including a lug extending upwardly from said top positioned to be engaged by said presser member upon rotation of said cap.

8. A cap as claimed in claim 7 wherein a pressure transfer pad for interacting with said engagement means is positioned adjacent said contact means and said upwardly extending lug is adjacent said pressure pad and projects thereabove, but projects thereabove, 9. A cap for use with a retaining container device having a generally circular opening therein generated about a center axis, said opening having an inner wall and a rim area generally around said opening defining a mounting plane, said cap comprising, a top having contact means adapted to engage said rim area, said top further having a generally elastomeric deflectable section extending radially inwardly and upwardly from said contact means toward said center axis and away from said mounting plane of said rim area and terminating in an apex area, a presser member secured to said top adjacent said apex area, said presser member being formed to extend downwardly and radially outwardly toward said contact means of said top but being generally spaced from said top in a free position, biasing means supported by said top for urging said presser member and said top toward said opening in the installed position of said cap, said presser member further having engagement means spaced radially outwardly and downwardly from said apex for interacting with and applying pressure to said contact means to urge said contact means toward said rim area under urging by said biasing means, and a plurality of spaced apart pressure transfer pads for interaction with said engagement means provided on said top adjacent said contact means which extend above said contact means in a direction approximately parallel to said center axis of said opening, with said presser member having a plurality of engagement means corresponding to said pads.

* * * * *